(12) United States Patent
Seo et al.

(10) Patent No.: US 9,417,380 B2
(45) Date of Patent: *Aug. 16, 2016

(54) LIGHT EMITTING DEVICE ARRAY AND BACKLIGHT UNIT

(71) Applicant: LG Innotek Co., Ltd., Seoul (KR)

(72) Inventors: Il Seo, Seoul (KR); Hongboem Jin, Seoul (KR); Sangwoo Lee, Seoul (KR)

(73) Assignee: LG INNOTEK, CO. LTD., Seoul (KR)

( * ) Notice: Subject to any disclaimer, the term of this patent is extended or adjusted under 35 U.S.C. 154(b) by 78 days.

This patent is subject to a terminal disclaimer.

(21) Appl. No.: 14/464,321

(22) Filed: Aug. 20, 2014

(65) Prior Publication Data

US 2014/0355306 A1 Dec. 4, 2014

Related U.S. Application Data

(63) Continuation of application No. 13/420,887, filed on Mar. 15, 2012, now Pat. No. 8,836,893.

(30) Foreign Application Priority Data

Jul. 7, 2011 (KR) .......................... 10-2011-0067408

(51) Int. Cl.
*G02F 1/1335* (2006.01)
*F21V 7/04* (2006.01)
*F21V 21/00* (2006.01)
*F21V 8/00* (2006.01)

(52) U.S. Cl.
CPC ............ *G02B 6/0091* (2013.01); *G02B 6/0068* (2013.01); *G02B 6/0073* (2013.01)

(58) Field of Classification Search
CPC ................. G02F 1/133615; G02F 1/133605;
G02F 1/133604; G02F 1/133626; G02F 2001/133618; G02F 1/1336; G02B 6/0068; G02B 6/0038; G02B 6/0055; G02B 6/0036; G02B 6/006; G02B 6/0021; F21S 4/001; F21S 4/003; F21W 2121/00
USPC ................... 349/65, 67, 68; 362/602, 249.01
See application file for complete search history.

(56) References Cited

U.S. PATENT DOCUMENTS 7,217,004 B2 5/2007 Park et al.
7,329,942 B2 2/2008 Tsou et al.
(Continued)

FOREIGN PATENT DOCUMENTS

CN 1451999 A 10/2003
CN 1716026 A 1/2006
(Continued)

OTHER PUBLICATIONS

European Search Report dated Jun. 11, 2012 issued in Application No. 12 15 9814.
(Continued)

*Primary Examiner* — Mike Qi
(74) *Attorney, Agent, or Firm* — KED & Associates, LLP

(57) ABSTRACT

A light emitting device array includes a substrate including a first region and a second region that is inclined with respect to the first region, a first light emitting device package arranged on the first region, and a second light emitting device package that is arranged on the second region and is inclined with respect to the first light emitting device package at an inclination angle between 90° and 160°.

11 Claims, 14 Drawing Sheets

(56) References Cited

U.S. PATENT DOCUMENTS

| | | | |
|---|---|---|---|
| 7,646,450 B2 | 1/2010 | Jung | |
| 7,891,840 B1 | 2/2011 | Kang et al. | |
| 8,836,893 B2 * | 9/2014 | Seo | G02B 6/0068 349/65 |
| 2002/0175632 A1 | 11/2002 | Takeguchi | |
| 2005/0007516 A1 | 1/2005 | Hong et al. | |
| 2006/0245210 A1 | 11/2006 | Lin et al. | |
| 2008/0316767 A1 | 12/2008 | Woo et al. | |
| 2011/0261286 A1 | 10/2011 | Choi et al. | |

FOREIGN PATENT DOCUMENTS

| | | |
|---|---|---|
| CN | 101726953 A | 6/2010 |
| CN | 201775361 U | 3/2011 |
| CN | 102022695 A | 4/2011 |
| CN | 201875577 U | 6/2011 |
| DE | 298 11 649 U1 | 12/1998 |
| DE | 10 2006 056 150 A1 | 5/2008 |

OTHER PUBLICATIONS

U.S. Office Action for parent U.S. Appl. No. 13/420,887 dated Oct. 18, 2013.

U.S. Office Action for parent U.S. Appl. No. 13/420,887 dated Feb. 4, 2014.

Chinese Office Action issued in Application No. 201210109929.X dated May 25, 2015. (with English Translation).

* cited by examiner

LIGHT EMITTING DEVICE ARRAY AND BACKLIGHT UNIT

CROSS-REFERENCE TO RELATED APPLICATION

This application is a Continuation application of U.S. patent application Ser. No. 13/420,887, filed Mar. 15, 2012, which claims the priority benefit of Korean Patent Application No. 10-2011-0067408, filed on Jul. 7, 2011, the subject matters of which are incorporated herein by reference.

BACKGROUND

1. Field

Embodiments relate to a light emitting device array and a backlight unit.

2. Description of the Related Art

Light Emitting Diodes (LEDs) are devices that convert electrical signals into light using characteristics of compound semiconductors and are used in home appliances, remote controls, electronic scoreboards, displays, various automated devices, and the like and the application range of LEDs continues to expand.

A backlight unit which employs LEDs may be used in a display device such as a liquid crystal display device and may also be used in lighting devices in other fields. A generally used backlight unit includes a light source, a light guide plate that diffuses light generated by the light source, and optical sheets that function to spread or focus light emitted from the light guide plate.

LEDs that are driven at low voltage and are highly efficient may be applied as the light source of the backlight unit. The LED is a 2-terminal diode including a compound semiconductor such as gallium arsenide (GaAs), Gallium Nitride (GaN), or indium gallium nitride (InGaN). When voltage is applied to the cathode and anode terminals of the LED, the LED emits visual light with light energy generated when electrons and holes are combined.

The backlight unit is classified into an edge type and a direct type depending on the position of the light source.

Edge type backlight units are generally applied to relatively small liquid crystal display devices such as monitors of laptop computers and desktop computers and have advantages in that the backlight units provide highly uniform light and have a long life and also contribute to achieving a slim liquid crystal display device.

When a backlight unit employing light emitting devices is configured, there is a need to guide light generated by the light emitting devices in a specific direction and to guarantee uniform emission over the display area of the backlight unit. In addition, it is also an important issue to achieve a slim and light backlight unit in order to improve productivity and increase user convenience.

SUMMARY

In one embodiment, a light emitting device array includes a substrate including a first region and a second region that is inclined with respect to the first region, a first light emitting device package arranged on the first region, and at least one second light emitting device package that is arranged on the second region and is inclined with respect to the first light emitting device package at an inclination angle between 90° and 160°.

In another embodiment, a backlight unit includes a light guide plate, and at least one light emitting device array arranged adjacent to a corner of the light guide plate which corresponds to an edge of one side surface of the light guide plate, the light emitting device array comprising a substrate including a first region and a second region that is inclined with respect to the first region, a first light emitting device package arranged on the first region, and at least one second light emitting device package that is arranged on the second region and is inclined with respect to the first light emitting device package at an inclination angle between 90° and 160°.

BRIEF DESCRIPTION OF THE DRAWINGS

Details of embodiments will be more clearly understood from the following detailed description taken in conjunction with the accompanying drawings, in which:

FIGS. 6A to 6E are partial cross-sectional views of the backlight unit according to an embodiment;

DETAILED DESCRIPTION OF EMBODIMENTS

Figure 1:
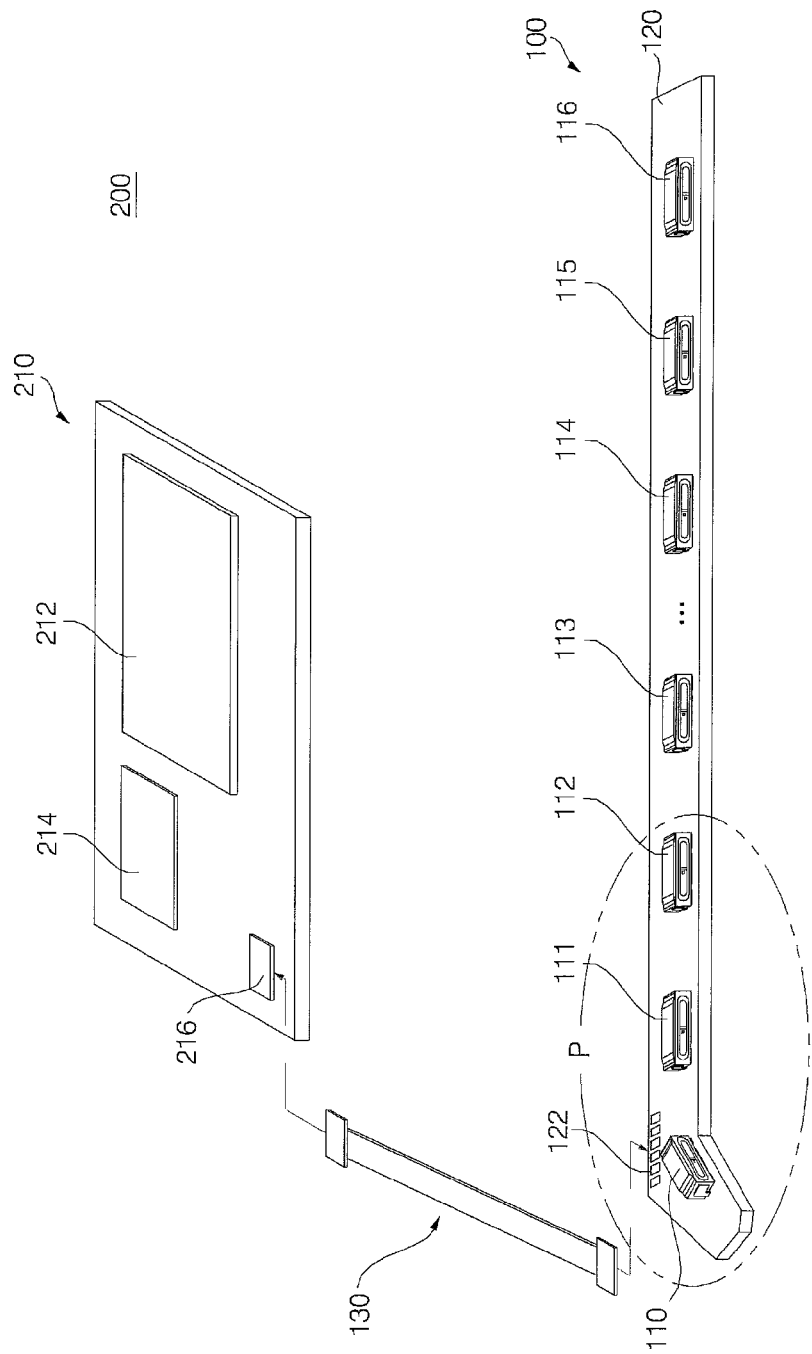
FIG. 1 is an exploded perspective view schematically illustrating a light emitting device module including an array of light emitting devices according to an embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

In the drawings, the thickness or size of each layer is exaggerated, omitted, or schematically illustrated for convenience of description and clarity. Also, the size of each constituent element does not entirely reflect the actual size thereof.

Reference will now be made in detail to embodiments, examples of which are illustrated in the accompanying drawings.

FIG. 1 is an exploded perspective view schematically illustrating a light emitting device module including an array of light emitting devices according to an embodiment.

As shown in FIG. 1, a light emitting device module 200 includes a power control module 210, a light emitting device array 100, and a connector 130.

The power control module 210 may include a power supply 212 that generates power that is consumed by a first light emitting device package 110 embedded in the light emitting device array 100, a control unit 214 that controls operation of the power supply 212, and a connector connection portion 216 connected to one end of the connector 130.

Here, the power supply 212 operates under control of the control unit 214 and generates power that is consumed by the light emitting device array 100.

The control unit 214 may control operation of the power supply 212 according to an externally input command.

The externally input command may be, but is not limited to, a command output from an input device (not shown) directly connected to the light emitting device module 200 or a command output from a remote control that is used to control operation of an apparatus including the light emitting device module 200.

The connector connection portion 216 is connected to one end of the connector 130 and may provide power supplied from the power supply 212 to the connector 130.

The light emitting device array 100 may include a first light emitting device package 110 and a plurality of second light emitting device packages 111 to 116, a substrate 120, on which the first light emitting device package 110 and the plurality of second light emitting device packages 111 to 116 are provided, and a connector terminal 122 that is formed on the substrate 120 and is connected to the other end of the connector 130.

Here, the connector terminal 122 may be electrically connected to the connector connection portion 216 through the connector 130.

The substrate 120 may be a printed circuit board (PCB), a flexible printed circuit board, or a metal board. When the substrate 120 is a PCB, the substrate 120 may be a single-sided PCB, a double-sided PCB, a multi-layer PCB, or the like. The embodiments will be described below with reference to an example in which the substrate 120 is a single-sided PCB although the substrate 120 is not limited to the single-sided PCB.

The first and the plurality of second light emitting device packages 110 to 116 may be, but are not necessarily, divided into a plurality of groups (not shown) and may be, but are not necessarily, connected in series or in parallel.

Although the number of the first and the plurality of second light emitting device packages 110 to 116 shown in FIG. 1 is 7, there is no limitation as to the total number of the first and the plurality of second light emitting device packages 110 to 116.

At least two of the first and the plurality of second light emitting device packages 110 to 116 may, but not necessarily, emit light of different colors or light of the same color.

For example, in the case in which the first and the plurality of second light emitting device packages 110 to 116 emit white light, the first and the plurality of second light emitting device packages 110 to 116 may be implemented using light emitting device packages that emit red light and light emitting device packages that emit blue light. Thus, light emitting device packages that emit red light and light emitting device packages that emit blue light may be alternately mounted. The first and the plurality of second light emitting device packages 110 to 116 that emit white light may also be implemented using light emitting device packages that emit red light, light emitting device packages that emit blue light, and light emitting device packages that emit green light.

The first and the plurality of second light emitting device packages 110 to 116 may, but not necessarily, have the same configuration and at least one thereof may, but not necessarily, include a plurality of light emitting devices (not shown). Each of the first and the plurality of second light emitting device packages 110 to 116 may be a side view type of light emitting device package that emits light from the side surfaces thereof.

The following description is given with reference to the case in which the first and the plurality of second light emitting device packages 110 to 116 have the same configuration.

Figure 2:
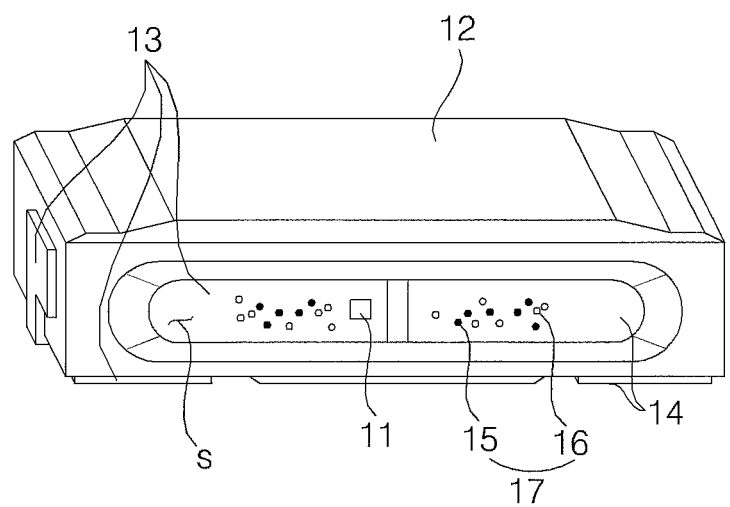
FIG. 2 is a perspective view of a first light emitting device package shown in FIG. 1.

FIG. 2 is a perspective view of the first light emitting device package shown in FIG. 1.

The first light emitting device package 110 shown in FIG. 2 has the same configuration as the second light emitting device packages 111 to 116 and at least one of the color of a fluorescent substance of the first light emitting device package 110 and the color of light emitted from a light emitting device of the first light emitting device package 110 may be different from that of the second light emitting device packages 111 to 116.

The first light emitting device package 110 may include a light emitting device 11 and a body 12 on which the light emitting device 11 is provided.

The body 12 may be formed of at least one of a resin substance such as polyphthalamide (PPA), silicon (Si), aluminum (Al), aluminum nitride (AlN), AlOx, liquid polymer, photo sensitive glass (PSG), polyamide 9T (PA9T), syndiotactic polystyrene (SPS), a metallic substance, sapphire (Al2O3), beryllium oxide (BeO), ceramic, and a printed circuit board (PCB).

The body 12 may be, but is not necessarily, formed using injection molding, etching, and the like.

A top surface of the body 12 may have various shapes that include, but are not limited to, a triangle, a rectangle, a polygon, and a circle.

The body 12 may have a cavity s in which the light emitting device 11 is arranged, a cross-sectional shape of the cavity s may be a cup, a concave bowl, or the like, and an inner surface of the body 12 that defines the cavity s may be formed obliquely in a downward direction.

The cavity s may have various plane shapes that include, but are not limited to, a circle, a quadrangle, a polygon, and an oval.

First and second lead frames 13 and 14 may be arranged on a lower surface of the body 12 and the first and second lead frames 13 and 14 may include one or more substance or alloy from among, for example, titanium (Ti), copper (Cu), nickel (Ni), gold (Au), chrome (Cr), tantalum (Ta), platinum (Pt), tin (Sn), silver (Ag), phosphorous (P), aluminum (Al), indium (In), palladium (Pd), cobalt (Co), silicon (Si), germanium (Ge), hafnium (Hf), ruthenium (Ru), and iron (Fe).

Each of the first and second lead frames 13 and 14 may be, but is not necessarily, formed in a single layer or multi-layer structure.

An inner surface of the body 12 may be formed obliquely at an inclination angle with respect to one of the first and second lead frames 13 and 14 and a reflection angle of light emitted from the light emitting device 11 may vary according to the inclination angle, thereby enabling control of the beam angle (or beam range) of externally emitted light. The degree of concentration of light externally emitted from the light emitting device 11 increases as the beam angle of the externally emitted light decreases and decreases as the beam angle increases.

The inner surface of the body 12 may, but is not necessarily, have a plurality of inclination angles.

The first and second lead frames 13 and 14 may be electrically connected to the light emitting device 11 and connected respectively to positive and negative poles of an external power source (not shown) to supply power to the light emitting device 11.

The light emitting device 11 may be mounted on the first lead frame 13. The light emitting device 11 may be die-bonded to the first lead frame 13 and may be wire-bonded to the second lead frame 14 through a wire (not shown) to receive power from the first and second lead frames 13 and 14.

Here, the light emitting device 11 may be, but is not limited to, wire-bonded or die-bonded to the first and second lead frames 13 and 14.

A cathode mark (not shown) may be formed on the body 12. The cathode mark may serve to discriminate the poles of the light emitting device 11, i.e., the poles of the first and second lead frames 13 and 14, to prevent confusion when electrically connecting the first and second lead frames 13 and 14.

The light emitting device 11 may be a light emitting diode (LED). The LED may be, but is not necessarily, a color LED that emits, for example, red, green, blue, or white light or an ultraviolet (UV) LED that emits ultraviolet light. A plurality of light emitting devices 11 may be mounted on the first lead frame 13 and at least one light emitting device 11 may be mounted on the first and second lead frames 13 and 14 although there is no limitation as to the number of the light emitting devices 11 and the mounting position thereof.

The embodiments are described below with reference to the case in which the light emitting device 11 is a blue light emitting device that emits blue light.

The body 12 may include a resin substance 17 that fills the cavity s. That is, the resin substance 17 may be, but is not necessarily, formed in a double-molding structure or a triple-molding structure.

The resin substance 17 may be formed in the shape of a film and may include at least one of a fluorescent substance and an optical diffusion substance and may also include a translucent substance that does not include a fluorescent substance and an optical diffusion substance although there is no limitation as to the shape and composition of the resin substance 17.

In an embodiment, the resin substance 17 may include first and second fluorescent substances 15 and 16 and may be mixed with a silicon substance (not shown) or may be formed in a double structure although there is no limitation as to the formation or composition of the resin substance 17.

Specifically, in the case in which the first light emitting device package 110 emits white light, the first and second fluorescent substances 15 and 16 may be a red fluorescent substance and a green substance because of the light emitting device 11 that emits blue light.

Although the embodiment has been described with reference to the case in which the resin substance 17 includes the first and second fluorescent substances 15 and 16, the resin substance 17 may include a fluorescent substance of single color which may be, but is not limited to, a yellow fluorescent substance.

In the case in which the light emitting device 11 emits red or green light, the first light emitting device package 110 may include a mixture of a blue fluorescent substance and a green fluorescent substance or a mixture of a blue fluorescent substance and a red fluorescent substance to emit white light.

Figure 3:
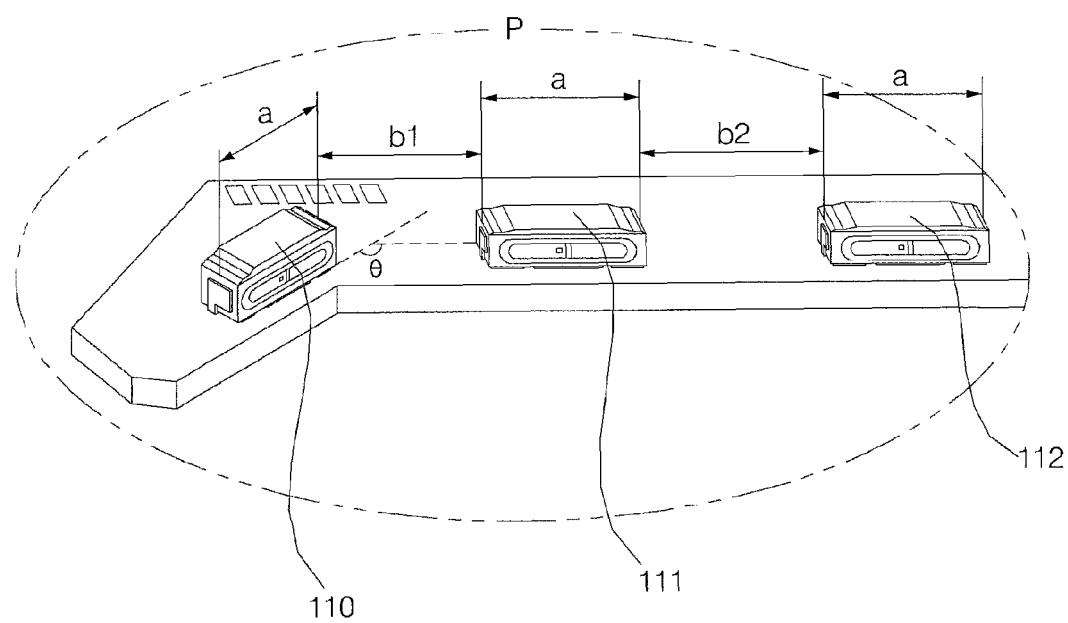
FIG. 3 is an enlarged view of a first embodiment of a 'P' block shown in FIG. 1.

FIG. 3 is an enlarged view of a first embodiment of a 'P' block shown in FIG. 1.

As shown in FIG. 3, the light emitting device array 100 according to an embodiment may include a first light emitting device package 110, a plurality of second light emitting device packages 111 and 112, and a substrate 120 on which the first and the plurality of second light emitting device packages 110 to 112 are arranged.

The plurality of second light emitting device packages 110 to 112 may have the same package size and embodiments are described below with reference to the case in which the plurality of second light emitting device packages 110 to 112 have the same configuration.

Here, the first light emitting device package 110 may be arranged adjacent to one edge of the substrate 120. The edge may have a bent portion and the first light emitting device package 110 may be arranged obliquely according to the bent portion.

That is, the first light emitting device package 110 may be inclined at an inclination angle $\theta$ with respect to the second light emitting device package 111 that is arranged adjacent to the first light emitting device package 110.

The inclination angle $\theta$ may be in a range of 90° to 160°. When the inclination angle $\theta$ is less than 90°, a beam range (or beam angle) (not shown) of light emitted from a light emitting surface of the first light emitting device package 110 is directed toward side surfaces and light emitting surfaces of the plurality of second light emitting device packages 111 and 112, thus generating a dark zone at the edge. When the inclination angle $\theta$ is greater than 160°, the beam range (or beam angle) (not shown) of light emitted from the light emitting surface of the first light emitting device package 110 does not greatly differ from beam ranges (not shown) of the plurality of second light emitting device packages 111 and 112 and therefore it is not possible to reduce the total number of light emitting device packages arranged on the substrate 120.

Here, a first separation distance b1 between the first light emitting device package 110 and the second light emitting device package 111 arranged adjacent thereto may be allowed to be equal to or longer than a second separation distance b2 between the plurality of second light emitting device packages 111 and 112.

That is, the first separation distance b1 may be changed according to the inclination angle $\theta$ and may be inversely proportional to the inclination angle $\theta$.

For example, the first separation distance b1 may be equal to the second separation distance b2 when the inclination angle $\theta$ is 160° and may be longer than the second separation distance b2 when the inclination angle $\theta$ is 90°.

As described above, the second light emitting device packages 111 and 112 are spaced from each other by the second separation distance b2 and the separation distance between each of the second light emitting device packages 114, 115, and 116 may be equal to the second separation distance b2 as shown in FIG. 1.

When the light emitting device packages of the light emitting device array 100 illustrated in the first embodiment have the same package size, the first separation distance b1 between the first and second light emitting device packages 110 and 111 may be changed according to the inclination angle $\theta$ between the first and second light emitting device packages 110 and 111.

Figure 4:
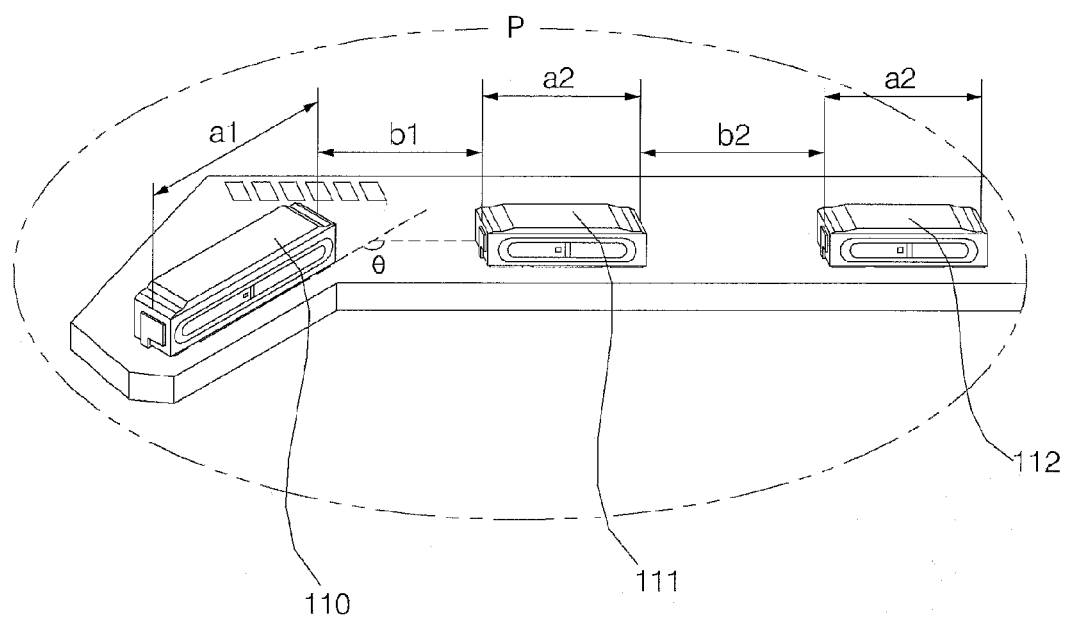
FIG. 4 is an enlarged view of a second embodiment of the 'P' block shown in FIG. 1.

FIG. 4 is an enlarged view of a second embodiment of a 'P' block shown in FIG. 1.

The same reference numbers as those of FIG. 3 are used for FIG. 4 and portions of the second embodiment similar to the first embodiment are not described or are briefly described below.

As shown in FIG. 4, the light emitting device array 100 according to an embodiment may include a first light emitting device package 110, a plurality of second light emitting device packages 111 and 112, and a substrate 120 on which the first light emitting device package 110 and the plurality of second light emitting device packages 111 and 112 are arranged.

Here, the first light emitting device package 110 may have a different package size from the second light emitting device packages 111 and 112.

That is, the first light emitting device package 110 may have a first package size a1 and the second light emitting device packages 111 and 112 may have a second package size a2 that is less than the first package size a1.

The first light emitting device package 110 may be inclined at an inclination angle θ with respect to the second light emitting device package 111 that is arranged adjacent to the substrate 120.

The inclination angle θ may be in a range of 90° to 160°. When the inclination angle θ is less than 90°, a beam range (or beam angle) (not shown) of light emitted from a light emitting surface of the first light emitting device package 110 is directed toward side surfaces and light emitting surfaces of the second light emitting device packages 111 and 112 to generate a blind zone at the edge. When the inclination angle θ is greater than 160°, the beam range (or beam angle) (not shown) of light emitted from the light emitting surface of the first light emitting device package 110 does not greatly differ from beam ranges (not shown) of the second light emitting device packages 111 and 112 and therefore it is not possible to reduce the total number of light emitting device packages arranged on the substrate 120.

Here, a first separation distance b1 between the first and second light emitting device packages 110 and 111 may be longer than a second separation distance b2 between the plurality of second light emitting device packages 111 and 112.

That is, the first separation distance b1 may be changed according to the inclination angle θ and the first and second package sizes a1 and a2 and may be inversely proportional to the inclination angle θ and may be proportional to at least one of the first and second package sizes a1 and a2.

However, the difference between the first and second separation distances b1 and b2 may be maximized when the inclination angle θ is 160° and may be minimized when the inclination angle θ is 90°.

The second and third light emitting device packages 111 and 112 are spaced from each other by the second separation distance b2 and the separation distance between each of the fifth, sixth, and seventh light emitting device packages 114, 115, and 116 may be equal to the second separation distance b2 as shown in FIG. 1.

In the light emitting device array 100 illustrated in the second embodiment, the first separation distance b1 between the first light emitting device package 110 having the first package size a1 and the second light emitting device package 111 that is adjacent to the first light emitting device package 110 and that has the second package size a2 may be changed according to the first package size a1 and the inclination angle θ.

Figure 5:
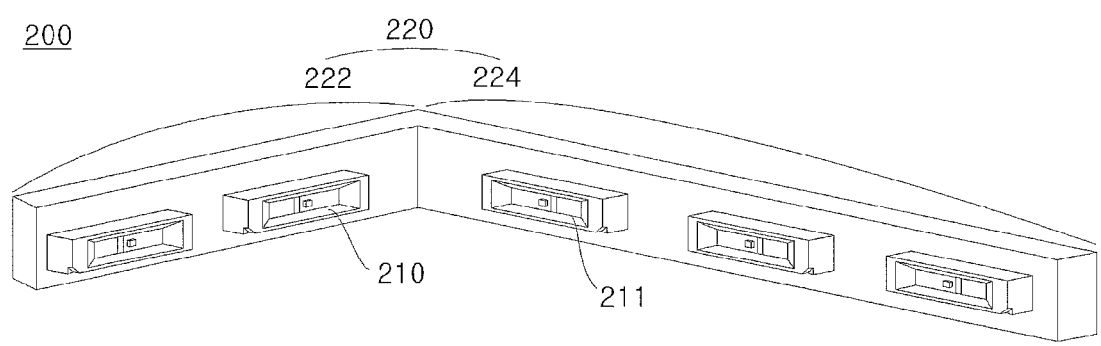
FIG. 5 illustrates a light emitting device array according to another embodiment.

FIG. 5 illustrates a light emitting device array 200 according to another embodiment.

As shown in FIG. 5, the light emitting device array 200 according to this embodiment may include a first light emitting device package 210, a second light emitting device package 211, and a substrate 220 on which the first light emitting device package 210 and the second light emitting device package 211 are arranged.

The substrate 220 may include a first region 222 and a second region 224 that are formed in a bent shape and the first region 222 and the second region 224 may be inclined with respect to each other.

The first light emitting device package 210 may be arranged on the first region 222 and the second light emitting device package 211 may be arranged on the second region 224. The first light emitting device package 210 and the second light emitting device package 211 which emit white light may be implemented using a light emitting device package that emits red light and a light emitting device package that emits blue light. Thus, light emitting device packages that emit red light and light emitting device packages that emit blue light may be alternately mounted. The light emitting device packages that emit white light may also be implemented using light emitting device packages that emit red light, light emitting device packages that emit blue light, and light emitting device packages that emit green light.

Each of the first and second light emitting device packages 210 and 211 may be of a top view type that emits light upwardly.

The substrate 220 may have a plurality of bent portions. When the substrate 220 has two bent portions, the substrate 220 may include a first region, a second region, and a third region and a light emitting device package may be arranged on each of the regions.

Figure 6A:
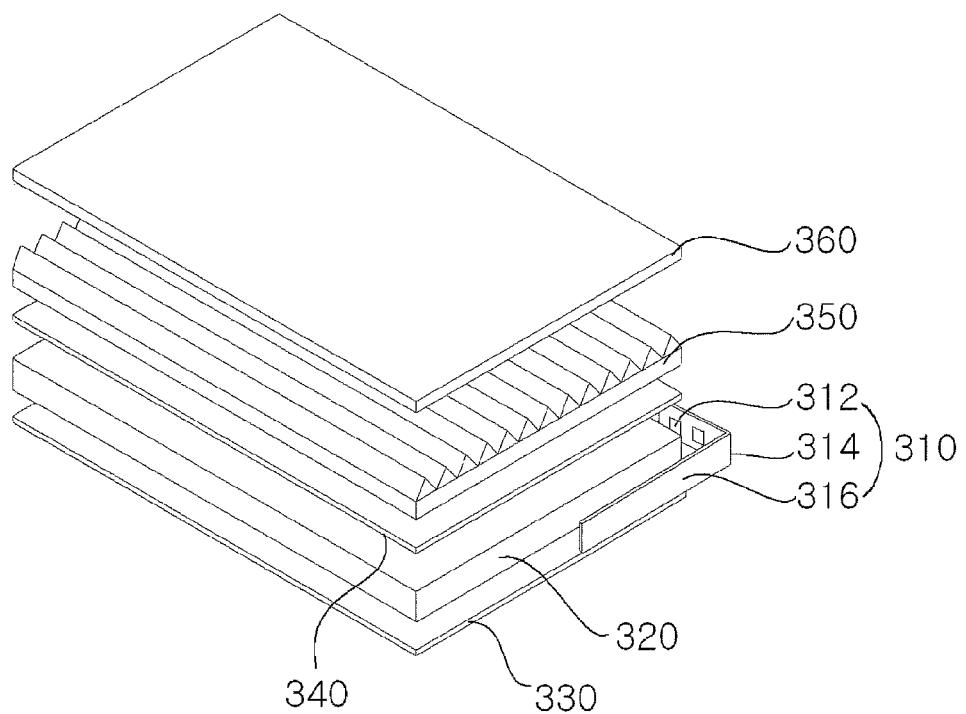
FIG. 6A is an exploded perspective view of a backlight unit according to one embodiment.

FIG. 6A is an exploded perspective view of a backlight unit 300 according to one embodiment and FIGS. 6A to 6E are partial cross-sectional views of the backlight unit 300 according to another embodiment.

As shown in FIG. 6A, the backlight unit 300 according to the embodiment is of an edge-light type and includes a light emitting device array 310 and a light guide plate 320. The light emitting device array 310 includes a substrate 316 and a light emitting device array 310. The substrate 316 is arranged adjacent to a corner (or corner edge) of the light guide plate 320, which corresponds to an edge of one side surface of the light guide plate 320, and has a bent portion 314 so as to form an inclination angle in a range of 90° to 160°. The light emitting device array 310 includes light emitting device packages 312 that are arranged on a portion of the substrate 316 which faces the light guide plate 320.

The backlight unit 300 is a means for providing light to a liquid crystal display device (not shown) and may be located at the rear side of the liquid crystal display device (not shown). The backlight unit 300 may provide light with high brightness and an appropriate viewing angle to the liquid crystal display device (not shown).

The light emitting device packages 312 may be provided on the substrate 316. The light emitting device packages 312 may be electrically connected to the substrate 316. The light emitting device packages 312 may receive power from the outside and generate and provide light to the light guide plate 320. Although the light emitting device packages 312 may be provided in one array on the substrate 316, there is no limitation as to how the light emitting device packages 312 are arrayed on the substrate 316 and the light emitting device packages 312 may be provided in several arrays on the substrate 316. The light emitting device packages 312 may be mounted on the substrate 316 so as to form an inclination angle and may be arranged thereon in an arbitrary form.

The light emitting device array 310 includes the substrate 316 and the light emitting device packages 312, and the light emitting device packages 312 may be arranged on the substrate 316 in the manner described above in the embodiment of FIG. 5.

The light emitting device packages 312 may simultaneously provide light to a plurality of side surfaces of the light guide plate 320. The light emitting device packages 312 can prevent generation of a dark zone at the corner of the light guide plate 320. The light emitting device packages 312 may provide light to one corner of the light guide plate 320 according to an embodiment.

A further detailed description of the light emitting device packages 312 is omitted herein since the light emitting device packages 312 have already been described above in detail with reference to FIG. 2.

The substrate 316 may be formed of a high heat protection substance. The substrate 316 may be formed obliquely at an inclination angle. The substrate 316 may be bendable. One portion of the substrate 316 may be bendable. One portion of the substrate 316 may be bent into an approximately L shape. The light emitting device packages 312 may be provided on one surface of the substrate 316. The surface of the substrate 316 on which the light emitting device packages 312 are provided may face one side surface of the light guide plate 320.

Figure 6B:
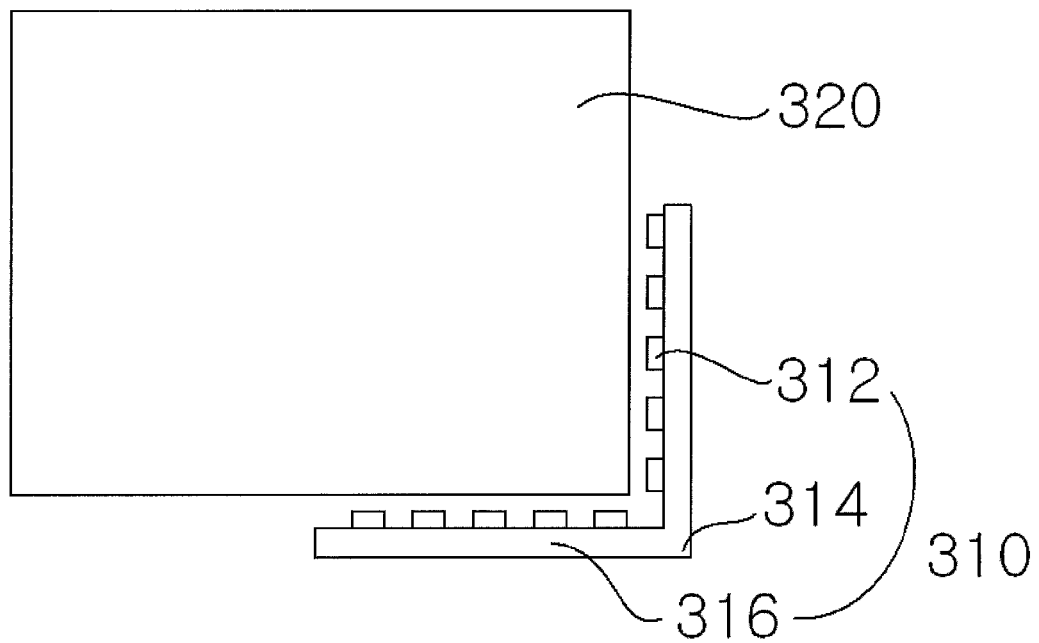

As shown in FIG. 6B, the substrate 316 may be bent at one portion of the longitudinal axis. The substrate 316 may be provided with the light emitting device packages 312 at both sides of the bent portion 314. Thus, the substrate 316 can provide light to side surfaces of the light guide plate 320.

When the top surface of the light guide plate 320 is approximately square, the substrate 316 may be bent at a middle portion of the longitudinal axis such that the bent portion 314 is located at one corner of the light guide plate 320 which corresponds to an edge of one side surface of the light guide plate 320.

The bent portion 314 of the substrate 316 may be provided at one corner of the light guide plate 320. The substrate 316 may be formed so as to surround a portion of the corner of the light guide plate 320. The substrate 316 may face one side surface of the light guide plate 320. The substrate 316 may also simultaneously face two side surfaces of the light guide plate 320.

Figure 6C:
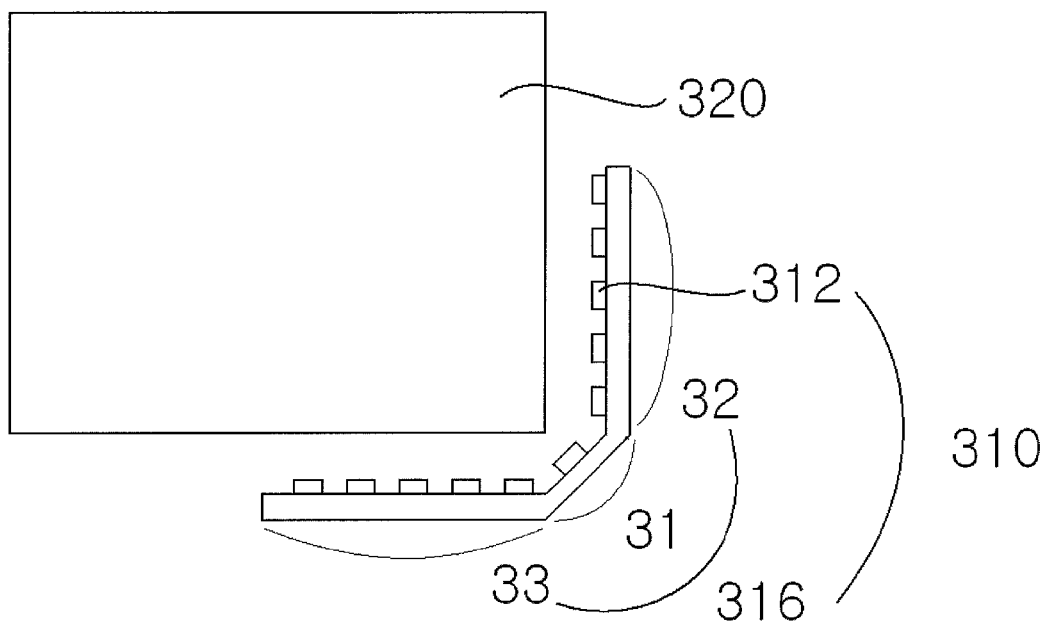

As shown in FIG. 6C, the substrate 316 according to another embodiment may be bent at two portions. The substrate 316 may include a light emitting device package 312 between the two bent portions 314. The substrate 316 may be provided such that the light emitting device package 312 provided between the two bent portions 314 of the substrate 316 faces a corner of the light guide plate 320 which corresponds to an edge of one side surface of the light guide plate 320.

For example, the substrate 316 may include a first region 31, a second region 32, and a third region 33.

The first region 31 may be inclined at an angle between 90° and 160° with respect to the second region 32 that is connected to one end of the first region 31. The first region 31 may also be inclined at an angle between 90° and 160° with respect to the third region 33 that is connected to the other end of the first region 31.

A first light emitting device package may be arranged on the first region 31, a second light emitting device package may be arranged on the second region 32, and a third light emitting device package may be arranged on the third region 33. Although the first light emitting device package, the second light emitting device package, and the third light emitting device package may be the same light emitting device packages 312, the first to third light emitting device packages may have different sizes or may emit light of different colors in some embodiments.

The light emitting device package(s) provided on the second region 32 may emit light to a corner of the light guide plate 320.

The substrate 316 may have one bent portion that is provided at one corner of the light guide plate 320 to eliminate a dark zone that could be generated when light are not provided to the corners of the light guide plate 320.

The substrate 316 may be provided at one corner of the light guide plate 320 which corresponds to an edge of one side surface of the light guide plate 320. The substrate 316 may be provided so as to surround a portion of one corner of the light guide plate 320. The substrate 316 may be provided such that an inner part of the bent portion 314 faces a corner of the light guide plate 320 which corresponds to an edge of one side surface of the light guide plate 320.

Figure 6D:
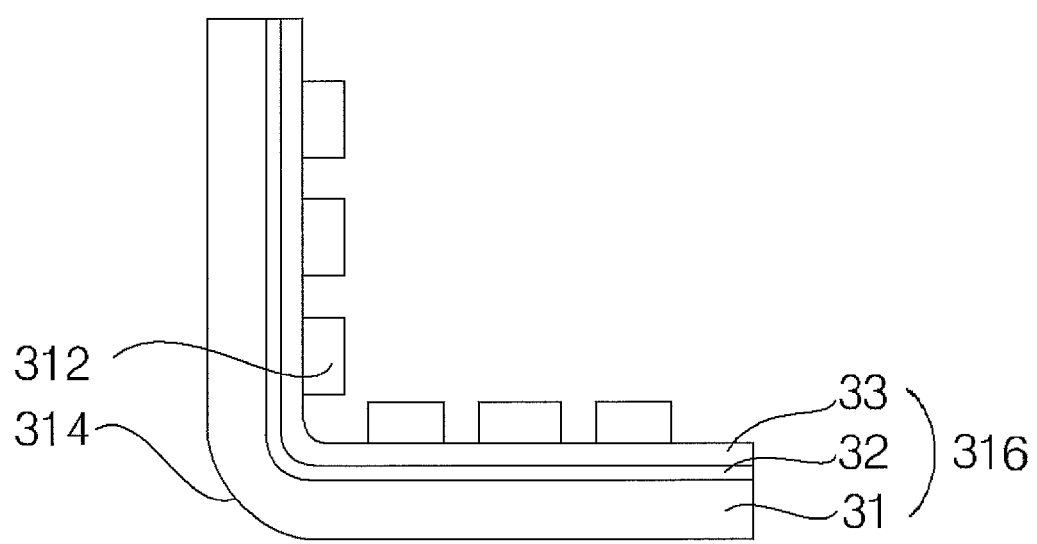

As shown in FIG. 6D, the substrate 316 of the backlight unit 300 according to an embodiment may have a multi-layer structure. The first layer 31 of the substrate 316 may include aluminum (Al). The substrate 316 may be bendable due to inclusion of aluminum in the first layer 31. The substrate 316 may be formed in an L shape. The substrate 316 may be bendable such that the substrate 316 may be, but is not necessarily, bent into an L shape.

The first layer 31 may include aluminum (Al) as described above. The first layer 31 may be bent. The first layer 31 may have high heat protection. The first layer 31 may be bendable to provide manufacturing convenience.

The first layer 31 may have a thickness between 300 μm and 500 μm. When the thickness of the first layer 31 is less than 300 μm, the first layer 31 may exhibit poor impact resistance due to such low thickness, causing manufacturing difficulties and reducing heat protection. When the thickness of the first layer 31 is greater than 500 μm, the bendability of the first layer 31 may be reduced and the first layer 31 may be a hindrance to achieving a slim backlight unit 300.

The second layer 32 may be formed of an insulating substance. The second layer 32 may have high thermal conductivity. The second layer 32 may be formed using epoxy or silicon resin filled with thermally conductive particles in order to increase thermal conductivity of the substrate 316. The second layer 32 may electrically separate the first layer 31 and the third layer 33. The second layer 32 may block current flowing in the first layer 31 from being provided to the third layer 33.

The third layer 33 may be formed of conductive metal. For example, the third layer 33 may include copper (Cu). The third layer 33 may be formed so as to be very thin. The third layer 33 may provide electricity to the light emitting device packages 312. The third layer 33 may be in contact with the light emitting device packages 312. The third layer 33 may include an electrode pattern (not shown). The electrode pattern (not shown) of the third layer 33 may be electrically connected to the light emitting device packages 312. The third layer 33 may provide electricity to the light emitting device packages 312 through the electrode pattern (not shown).

The surface of the substrate 316 on which the light emitting device packages 312 are provided may face the light guide plate 320. For example, the substrate 316 may face one side surface of the light guide plate 320. The substrate 316 may provide electricity to the light emitting device packages 312.

One side surface of the light guide plate 320 may face the surface of the substrate 316 on which the light emitting device packages 312 are arranged. The top and bottom surfaces of the light guide plate 320 may have an area larger than that of the side surfaces of the light guide plate 320. One side surface of the light guide plate 320 may receive light from the light emitting device packages 312. A reflective pattern of the light guide plate 320 may be formed on the bottom surface of the light guide plate 320. The light guide plate 320 may also include a reflective pattern layer (not shown) at the bottom surface.

The reflective pattern layer (not shown) may be arranged on the bottom surface of the light guide plate 320. The reflective pattern layer (not shown) may be in the form of dots or lines. The reflective pattern layer (not shown) may be formed by spreading ink onto the light guide plate 320 or by etching the light guide plate 320 although there is no limitation as to the forming process or substance of the reflective pattern layer.

A polymethylmethacrylate (PMMA) or transparent acrylic resin that is formed in a flat type or a wedge type may be used as the light guide plate 320. Although the light guide plate 320 may also be formed of glass, there is no limitation as to the composition of the light guide plate 320. Since the strength of the transparent acrylic resin is high, the transparent acrylic resin is hardly deformed and has a small weight and high visible light transmittance. In an edge light type, the light emitting device packages 312 are located at the external surface of the backlight unit 300 such that edge portions of the backlight unit 300 may be brighter than other portions. Since the light guide plate 320 has high visible light transmittance, it is possible to prevent the phenomenon that light passes through the backlight unit 300 unevenly over the entire surface and brightness increases at the edge portions of the backlight unit 300.

The light guide plate 320 may convert light incident on the light emitting device packages 312 into surface light. The bottom surface of the light guide plate 320 may be formed obliquely or an oblique pattern may be formed at the bottom surface of the light guide plate 320 to cause irregular reflection. The light guide plate 320 may generate uniform surface light using such reflection.

The reflective pattern (not shown) may be formed at the bottom surface of the light guide plate 320. The reflective pattern (not shown) may cause irregular reflection. The reflective pattern (not shown) may be formed into a specific shape taking into consideration the distance between the reflective pattern and the light emitting device packages 312. The reflective pattern (not shown) may be formed by shaping the surface of the light guide plate 320 or by spreading ink onto the surface of the light guide plate 320 although there is no limitation as to how the reflective pattern is formed. The reflective pattern (not shown) may prevent light incident on the light guide plate 320 from the light emitting device packages 312 from concentrating upon both ends of the surface of the light guide plate 320. The reflective pattern (not shown) may allow light to be uniformly emitted from the top surface of the light guide plate 320. The reflective pattern (not shown) may provide high brightness and uniformity surface light to the entirety of the liquid crystal display panel.

Optical sheets 340, 350, and 360 may be arranged on the top surface of the light guide plate 320. The optical sheets 340, 350, and 360 may overlap the light guide plate 320. The optical sheets 340, 350, and 360 may include a diffusion film 340, a prism film 350, and a protective film 360. The diffusion film 340 contains diffusion particles such as beads in order to spread light at the top of the light guide plate 320. The prism film 350 has a prism pattern that is formed at the top surface of the prism film 350 to focus light above the diffusion film 340. The protective film 360 is layered on the top of the prism film 350 to protect the prism film 350. The prism film 350 may improve brightness of the light. The optical sheets 340, 350, and 360 diffuse and focus light that is guided by the light guide plate 320 after being emitted from the light emitting device packages 312, thereby achieving desired brightness and viewing angle.

The diffusion film 340 scatters and focuses light incident from the light emitting device packages 312 or returned light reflected from the prism film 350 to achieve uniform brightness.

The diffusion film 340 may be formed of transparent resin in the form of a thin sheet. For example, the diffusion film 340 may be formed by coating resin for light scattering and focusing on a polycarbonate or polyester film.

The prism film 350 includes a prism pattern that is formed horizontally or vertically on a surface of an optical film to focus light emitted from the diffusion film 340.

The prism pattern of the prism film 350 may be formed so as to have a triangular cross-section in order to increase focusing efficiency. The prism film 350 achieves highest brightness when using a right-angled prism having a vertical angle of 90°.

The protective film 360 may be layered on the top of the prism film 350 to protect the prism film 350.

The reflection sheet 330 is formed at the bottom (i.e., rear surface) of the backlight unit 300 and reflects light generated by the light emitting device packages 312 toward the front of the backlight unit 300 to increase light transfer efficiency.

Figure 6E:
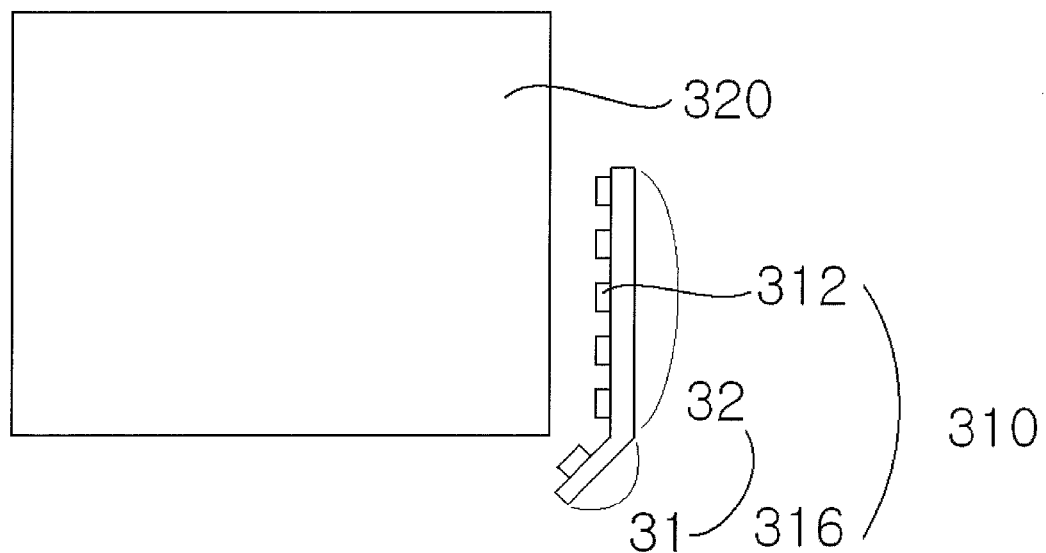

FIG. 6E is a partial cross-sectional view of a backlight unit according to another embodiment.

As shown in FIG. 6E, the light emitting device array 310 includes a substrate 316 having a first region 31 and a second region 32 and light emitting device packages 312 arranged on the substrate 316.

The first region 31 and the second region 32 may be inclined at an angle between 90° and 160° with reference to each other. A first light emitting device package may be arranged on the first region 31 and a second light emitting device package may be arranged on the second region 32. Although the first light emitting device package and the second light emitting device package may be the same light emitting device packages, the first and second light emitting device packages may have different sizes or may emit light of different colors in some embodiments as described above in the embodiment of FIG. 4.

The light emitting device package arranged on the first region 31 may emit light to a corner of the light guide plate 320. The light emitting device array 310 emits light at two angles to the light guide plate 320, thereby minimizing the occurrence of a dark zone on the top surface of the light guide plate 320.

Figure 7A:
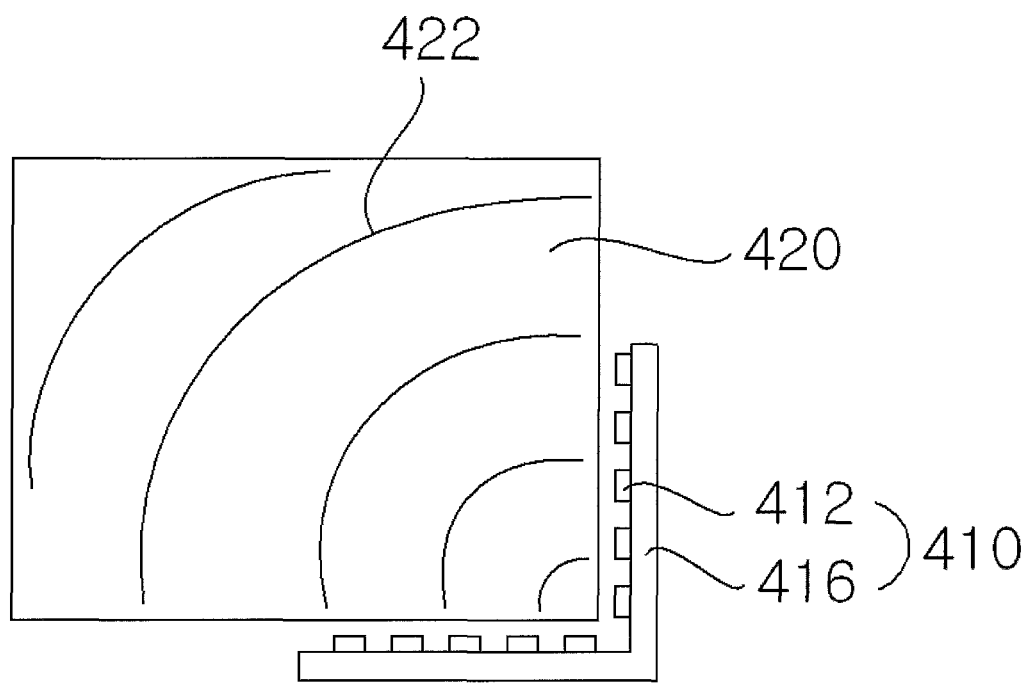
FIG. 7A is a partial cross-sectional view of a backlight unit according to an embodiment.
Figure 7B:
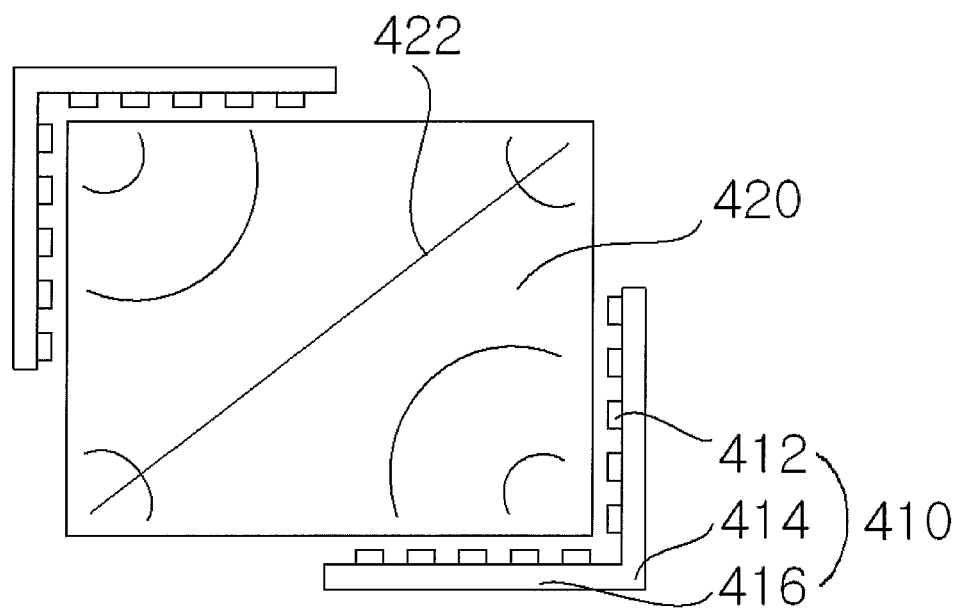
FIG. 7B is a partial cross-sectional view of a backlight unit according to an embodiment.
Figure 7C:
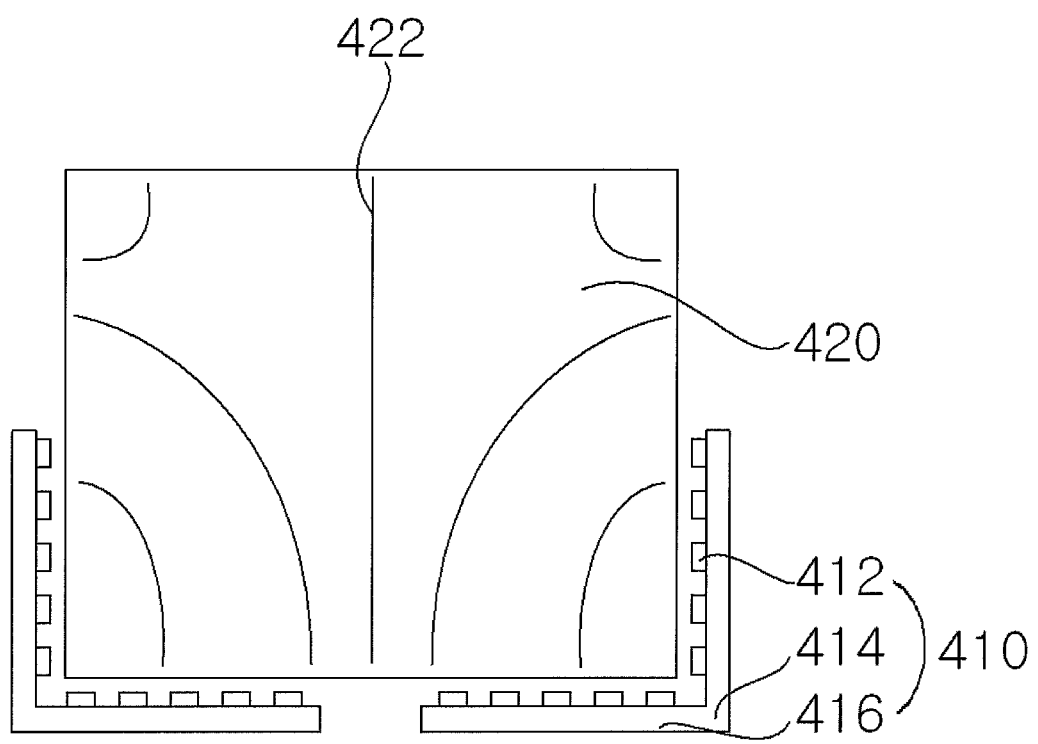
FIG. 7C is a partial cross-sectional view of a backlight unit according to an embodiment.

FIG. 7A is a partial cross-sectional view of a backlight unit according to an embodiment, FIG. 7B is a partial cross-sectional view of a backlight unit according to an embodiment, and FIG. 7C is a partial cross-sectional view of a backlight unit according to an embodiment.

As shown in FIG. 7A, a reflective pattern 422 may be formed on the bottom surface of a light guide plate 420. The reflective pattern 422 may be formed on the bottom surface of the light guide plate 420 to achieve uniform surface light.

The reflective pattern 422 may be provided at the bottom surface of the light guide plate 420. The reflective pattern 422 may irregularly reflect light incident on the light guide plate 420 to direct the light to the top surface of the light guide plate 420.

The reflective pattern 422 may include a plurality of repeated figures. The interval between each pair of adjacent figures of the reflective pattern 422 may decrease as the distance between the pair of adjacent figures and the light emitting device array 410 increases. The area of each figure of the reflective pattern 422 may increase as the distance between the figure and the light emitting device array 410 increases.

The reflective pattern 422 may control the intensity of light reflected to the top surface of the light guide plate 420. The interval between each pair of adjacent figures of the reflective pattern 422 may be adjusted to control the intensity of light reflected to the top surface of the light guide plate 420. Figures of the reflective pattern 422 may be arranged more closely to reflect a greater intensity of light to the top surface as the distance between the figures and the light emitting device array 410 increases.

The reflective pattern 422 may be approximately in the form of an arc. The reflective pattern 422 may be in the form of a curve. The reflective pattern 422 may be in the form of an array of curves. The reflective pattern 422 may be in the form of arcs. The reflective pattern 422 may be in the form of arcs which are centered on a corner of the light guide plate 420 which is adjacent to the light emitting device array 410. The reflective pattern 422 may also be in the form of parts of a circle which is centered on the corner of the light guide plate 420.

Such arcs of the reflective pattern 422 may convert light incident on the light guide plate 420 into surface light. The reflective pattern 422 may minimize the influence which a decrease in the intensity of light as the distance from the light emitting device package 412 increases has upon the uniformity of the surface light.

Referring to FIG. 7B, a backlight unit 400 according to an embodiment may include two substrates 416.

Two light emitting device arrays 410 may be arranged at two different corners of the light guide plate 420. When the backlight unit 400 includes a plurality of light emitting device arrays 410, it is possible to increase the intensity of light incident on the light guide plate 420.

According to an embodiment, the light guide plate 420 may include four corners (or corner edges) between the side surfaces thereof. Each of the top and bottom surfaces of the light guide plate 420 may take the form of a quadrangle as shown in FIG. 7B.

The light emitting device arrays 410 may be arranged respectively at two diagonally opposite corners of the light guide plate 420. A bent portion 414 of each of the light emitting device arrays 410 may be arranged at a corner of the light guide plate 420. A surface of the light emitting device array 410 on which light emitting device packages 412 are provided may face one side surface of the light guide plate 420. The light emitting device array 410 may include light emitting device packages 412 to eliminate a dark zone that may occur on the light guide plate 420. A plurality of light emitting device arrays 410 may be arranged facing each other to emit light to a plurality of side surfaces of the light guide plate 420 to improve the intensity of light of the backlight unit 400.

The reflective pattern 422 according to an embodiment may be formed on the bottom surface of the light guide plate 420. The reflective pattern 422 may include a line that intersects a virtual line connecting the two corners at which the light emitting device arrays 410 are arranged. For example, the reflective pattern 422 may include a line that connects two corners other than the two corners at which the light emitting device arrays 410 of the light guide plate 420 are arranged. The reflective pattern 422 may prevent light incident from two directions from concentrating upon a specific portion. The reflective pattern 422 may allow luminance of the light guide plate 420 to be uniform at the center and side portions thereof.

As shown in FIG. 7C, a backlight unit according to an embodiment may include two light emitting device arrays 410. The light emitting device arrays 410 may be arranged at two adjacent corners of the light guide plate 420. When the backlight unit includes a plurality of light emitting device arrays 410, it is possible to increase the intensity of light incident on the light guide plate 420.

The reflective pattern 422 may include a figure (for example, a line) that extends in a direction perpendicular to a line that connects two corners of the light guide plate 420 that are adjacent to the light emitting device arrays 410. The reflective pattern 422 may include a line that divides one quadrangle, which is the shape of the light guide plate 420 when viewed from the top, into two rectangles. The reflective pattern 422 may include a figure that is formed to divide the light guide plate 420 in the middle thereof.

The reflective pattern 422 may include a figure that is formed to divide the light guide plate 420 into two rectangles to reduce the phenomenon of concentration of light incident from the light emitting device packages 412 of the light emitting device array 410 upon a specific portion. The reflective pattern 422 may allow the luminance of the light guide plate 420 to be uniform at the center and side portions thereof. The reflective pattern 422 may reduce the phenomenon of concentration of light, the intensity of which has been increased by adding light emitting device packages 412, upon a specific portion.

Figure 8:
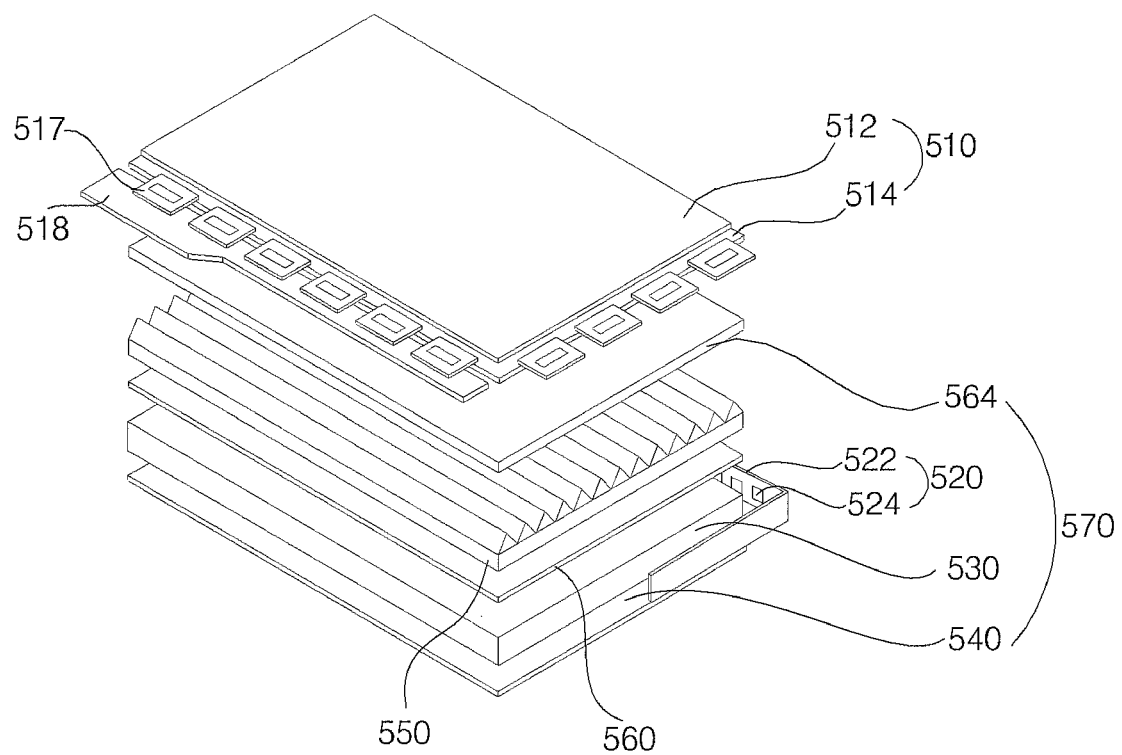
FIG. 8 is a perspective exploded view of a liquid crystal display device including a backlight unit according to an embodiment.

FIG. 8 is a perspective exploded view of a liquid crystal display device 500 including a backlight unit 570 according to an embodiment. Portions that have already been described above will not be described in further detail.

In the embodiment of FIG. 8, the liquid crystal display device 500 may be a liquid crystal display device of an edge light type which includes a liquid crystal display panel 510 and a backlight unit 570 that provides light to the liquid crystal display panel 510.

The liquid crystal display panel 510 may display an image using light received from the backlight unit 570. The liquid crystal display panel 510 may include a color filter substrate 512 and a thin film transistor substrate 514 that face each other with liquid crystal disposed therebetween.

The color filter substrate 512 may add color to an image that is to be displayed through the liquid crystal display panel 510.

The thin film transistor substrate 514 is electrically connected to a printed circuit board 518, on which a number of circuit parts are mounted, through a drive film 517. The thin film transistor substrate 514 may apply a drive voltage received from the printed circuit board 518 to the liquid crystal in response to a drive signal provided from the printed circuit board 518.

The thin film transistor substrate 514 may include thin film transistors and pixel electrodes that are formed in thin films on another transparent substrate such as glass or plastic.

The backlight unit 570 may include light emitting device packages 524, a light guide plate 530, optical sheets 550, 560, and 564, and a reflection sheet 540. The light emitting device packages 524 emit light and the light guide plate 530 converts light provided from the light emitting device packages 524 into surface light and provides the surface light to the liquid crystal display panel 510. The optical sheets 550, 560, and 564 achieve a uniform brightness distribution of light provided from the light guide plate 530 and improve the vertical incidence property. The reflection sheet 540 reflects light emitted from the rear surface of the light guide plate 530 toward the front surface of the light guide plate 530. A light source module 520 may include a plurality of light emitting device packages 524 and a substrate 522 on which the light emitting device packages 524 are mounted to constitute a light emitting device array 520.

The substrate 522 of the backlight unit 570 according to an embodiment may be formed obliquely at an inclination angle and arranged at a corner of the light guide plate 530 which corresponds to an edge of one side surface of the light guide plate 530. The light emitting device packages 524 provide light to two side surfaces of the light guide plate 530 between which the corner of the light guide plate 530 is located, thereby preventing the occurrence of a dark zone in the light guide plate 530.

Using the substrate 522 according to the embodiment, it is possible to improve the intensity of light emitted from the backlight unit 570 and to achieve optical reliability.

Figure 9:
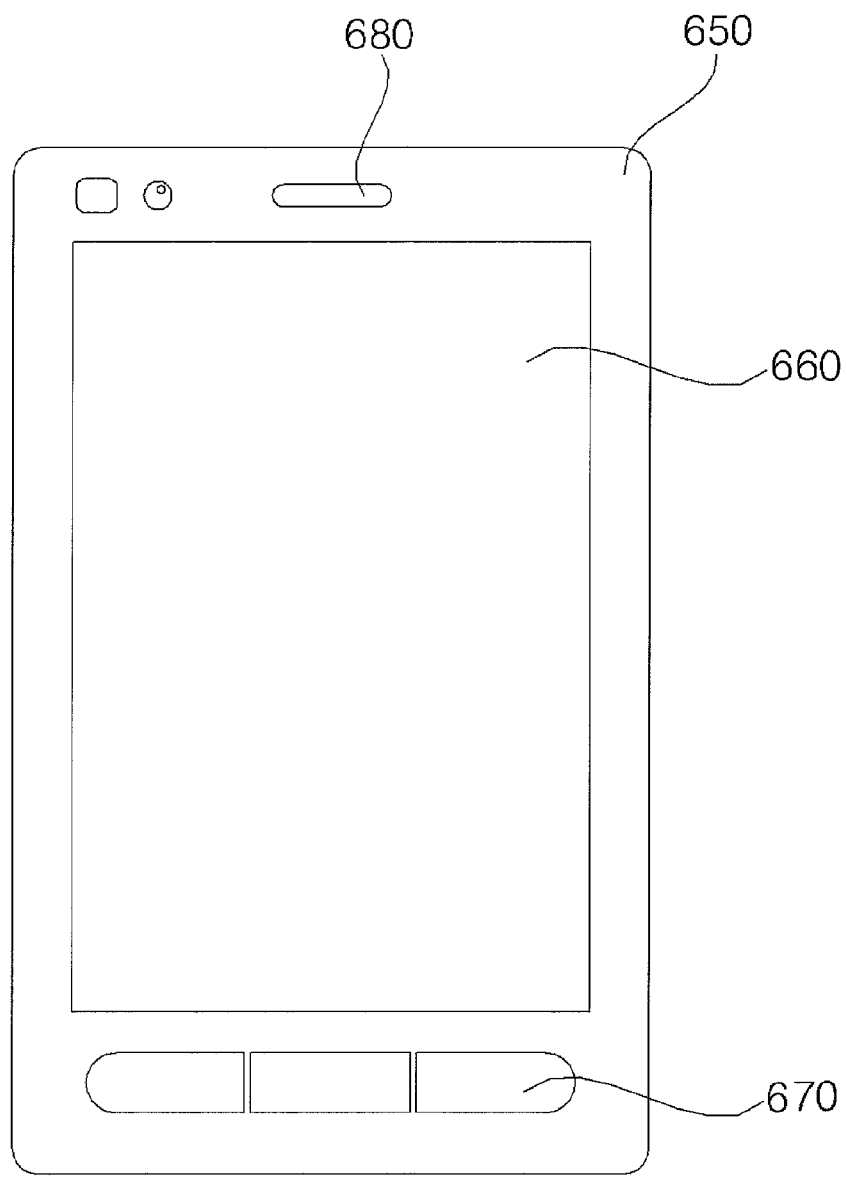
FIG. 9 is a cross-sectional view of an electronic device including a backlight unit (not shown) according to an embodiment.

FIG. 9 is a cross-sectional view of an electronic device including a backlight unit (not shown) according to an embodiment.

Although a mobile communication terminal 600 is illustrated as an example of the electronic device including the backlight unit (not shown) in the embodiment of FIG. 9, there is no limitation as to the type of the electronic device including the backlight unit.

The mobile communication terminal 600 according to the embodiment may include a receiver portion 680, a screen 660, operating keys 670, and a camera 610. The receiver portion 680 outputs an audio signal or the like of the communication counterpart. The screen 660 may function as a display device. The operating keys 670 are used, for example, to start and end communication. The camera 610 is used, for example, to perform video communication or to take a photograph. The screen 660 may include a touch panel such that the screen 660 may be used not only as a display device but also as an input device.

A liquid crystal display device (not shown) may be provided inside the screen 660 and the liquid crystal display device (not shown) may include a backlight unit (not shown).

The substrate (not shown) of the backlight unit (not shown) according to an embodiment may be obliquely arranged at an inclination angle and arranged at a corner of the light guide plate (not shown) which corresponds to an edge of one side surface of the light guide plate. The light emitting device packages (not shown) provide light to two side surfaces of the light guide plate (not shown) between which the corner of the light guide plate (not shown) is located, thereby preventing the occurrence of a dark zone in the light guide plate (not shown).

Using the substrate (not shown) according to the embodiment, it is possible to improve the intensity of light emitted from the backlight unit (not shown) and to achieve optical reliability.

In the light emitting device array according to an embodiment, a light emitting device package that is arranged adjacent to one edge of the substrate is formed obliquely, and therefore it is possible to prevent the occurrence of a dark zone at the edges of the substrate.

In addition, the light emitting device array according to an embodiment includes light emitting device packages arranged such that light emitted from a light emitting device package, which is arranged adjacent to one edge of the substrate and which is formed obliquely, overlaps light emitted from a light emitting device package adjacent to the light emitting device package, and therefore it is possible to reduce the total number of light emitting device packages arranged on the substrate and to increase light emission efficiency.

Further, the backlight unit according to an embodiment includes a light emitting device array that is bendable and therefore it is possible to easily fix the light emitting device array at a corner of the light guide plate.

Furthermore, the backlight unit according to an embodiment includes a light emitting device array that is provided at one corner of the light guide plate and therefore it is possible to prevent the occurrence of a dark zone at the four corners of the light guide plate.

Moreover, the backlight unit according to an embodiment includes a pattern formed on the bottom surface of the light guide plate and therefore it is possible to generate surface light that is uniform over the entire surface of the light guide plate.

Although the disclosure has been illustrated and described above with reference to the specific embodiments, the disclosure is not limited to the specific embodiments and it will be apparent to those skilled in the art that various modifications can be made to the embodiments without departing from the scope of the disclosure as disclosed in the accompanying claims and such modifications should not be construed as departing from the spirit or scope of the disclosure.

What is claimed is:

1. A lighting device comprising:
a light guide plate; and
at least one light emitting device array arranged adjacent to a corner of the light guide plate that corresponds to an edge of one side surface of the light guide plate, the light emitting device array comprising:
 a substrate includes a first region and a second region that are formed in a bent shape, and the first region of the substrate is inclined with respect to the second region of the substrate,
 a first light emitting device package disposed on the first region,
 a second light emitting device package that is disposed on the second region and is inclined with respect to the first light emitting device package at an inclination angle between 90° and 160°, wherein the first light emitting device package or the second light emitting device package faces the corner of the light guide plate that corresponds to the edge of one side surface of the light guide plate and provides light to the corner of the light guide plate; and
 a reflective pattern including an arc in a form of parts of a circle that is centered on the corner of the light guide plate, wherein the arc is adjacent to the light emitting device array.

2. The lighting device according to claim 1, wherein the first region is arranged to face the corner of the light guide plate.

3. The lighting device according to claim 1, wherein the substrate further comprises a third region that is inclined with respect to the first region, and the light emitting device array further comprises a third light emitting device package that is disposed on the third region.

4. The lighting device according to claim 3, wherein the first region of the substrate is adjacent to the corner of the light guide plate.

5. The lighting device according to claim 1, wherein the reflective pattern is formed at a bottom surface of the light guide plate.

6. The lighting device according to claim 1, wherein the reflective pattern comprises a plurality of pattern elements formed such that an interval between each pair of adjacent pattern elements decreases as a distance between the pair of adjacent pattern elements and the light emitting device array increases.

7. The lighting device according to claim 1, wherein the reflective pattern comprises a plurality of pattern elements formed such that an area of each pattern element increases as a distance between the pattern element and the light emitting device array increases.

8. The lighting device according to claim 1, wherein the light emitting device array comprises at least two light emitting device arrays that are arranged at different corners of the light guide plate.

9. The lighting device according to claim 8, wherein the light emitting device arrays are arranged at corners of the light guide plate that correspond to edges of different side surfaces of the light guide plate.

10. The lighting device according to claim 9, wherein the reflective pattern is formed on a bottom surface of the light guide plate and the light guide plate includes a line that connects two corners other than the two corners at which the light emitting device arrays of the light guide plate are arranged.

11. The lighting device according to claim 8, wherein the light emitting device arrays are arranged at two corners of the light guide plate that are connected by one side surface of the light guide plate.

* * * * *